United States Patent
Gupta et al.

(10) Patent No.: US 11,157,543 B2
(45) Date of Patent: *Oct. 26, 2021

(54) SYSTEMS AND METHODS FOR GENERATING BANDWIDTH CONSTRAINED RECOMMENDATIONS

(71) Applicant: Rovi Guides, Inc., San Jose, CA (US)

(72) Inventors: Vikram Makam Gupta, Karnataka (IN); Vishwas Sharadanagar Panchaksharaiah, Tumkur District (IN)

(73) Assignee: Rovi Guides, Inc., San Jose, CA (US)

(*) Notice: Subject to any disclaimer, the term of this patent is extended or adjusted under 35 U.S.C. 154(b) by 233 days.

This patent is subject to a terminal disclaimer.

(21) Appl. No.: 16/365,288

(22) Filed: Mar. 26, 2019

(65) Prior Publication Data

US 2020/0311118 A1 Oct. 1, 2020

(51) Int. Cl.
| | |
|---|---|
| *G06F 16/30* | (2019.01) |
| *G06F 16/438* | (2019.01) |
| *G06F 16/435* | (2019.01) |
| *H04N 21/442* | (2011.01) |
| *H04N 21/472* | (2011.01) |
| *H04N 21/45* | (2011.01) |
| *G06F 16/29* | (2019.01) |

(52) U.S. Cl.
CPC ......... *G06F 16/4387* (2019.01); *G06F 16/29* (2019.01); *G06F 16/437* (2019.01); *H04N 21/44209* (2013.01); *H04N 21/4524* (2013.01); *H04N 21/47217* (2013.01)

(58) Field of Classification Search
CPC ..... G06F 16/4387; G06F 16/437; G06F 16/29
USPC ........ 707/609, 687, 705, 769, 790, 813, 821
See application file for complete search history.

(56) References Cited

U.S. PATENT DOCUMENTS

| | | | |
|---|---|---|---|
| 8,260,315 B2* | 9/2012 | Fortescu ............... | H04W 4/21 455/456.1 |
| 10,244,016 B1* | 3/2019 | Binns .................... | H04L 65/80 |
| 2003/0110293 A1* | 6/2003 | Friedman ............ | H04L 43/0817 709/245 |
| 2008/0134043 A1 | 6/2008 | Georgis et al. | |
| 2014/0280214 A1 | 9/2014 | Han et al. | |

(Continued)

OTHER PUBLICATIONS

U.S. Appl. No. 16/365,287, filed Mar. 26, 2019, Vikram Makam Gupta.

*Primary Examiner* — Sana A Al-Hashemi
(74) *Attorney, Agent, or Firm* — Haley Guiliano LLP

(57) ABSTRACT

The system and methods described generate a content playlist by receiving, from a content device, a request for a content playlist. The system obtains a geographic route associated with the content device and the time period and determines a bandwidth profile associated with the geographic route, the content device, and the time period. The system then identifies a plurality of candidate content items based on a user profile associated with the content device and determines, for each of the plurality of candidate content items, an interest profile representing the correlation of segments in the respective candidate content item and the user profile. The system selects a plurality of the selected content items from the plurality of candidate content items for inclusion in the content playlist based on the interest profile for the respective candidate content item and the determined bandwidth profile and provides the content playlist to the content device.

15 Claims, 10 Drawing Sheets

(56) References Cited

U.S. PATENT DOCUMENTS

| | | |
|---|---|---|
| 2015/0058903 A1 | 2/2015 | Iyengar et al. |
| 2016/0192296 A1 | 6/2016 | Rehan et al. |
| 2016/0234290 A1 | 8/2016 | Sharma |
| 2017/0019446 A1 | 1/2017 | Son et al. |
| 2017/0255966 A1 | 9/2017 | Khoury |
| 2018/0102985 A1* | 4/2018 | Byers .................. H04L 47/80 |
| 2018/0367483 A1 | 12/2018 | Rodriguez et al. |
| 2019/0320229 A1 | 10/2019 | Shaw et al. |
| 2019/0342419 A1 | 11/2019 | Bromand et al. |

\* cited by examiner

SYSTEMS AND METHODS FOR GENERATING BANDWIDTH CONSTRAINED RECOMMENDATIONS

BACKGROUND

The present disclosure is directed to generating content recommendations and, more particularly, to generating content recommendations based on bandwidth constraints.

SUMMARY

The ability to consume content while a user travels plays an important role in consumer lives. As mobile networks improve and content delivery and streaming services become more and more prevalent, consumers continue to rely on the ability to consume content on the go through mobile networks. But as more consumers join mobile networks and consume content via those networks, the bandwidth available to each consumer erodes and the ability for an individual consumer to enjoy an uninterrupted stream of content diminishes. As consumers continue to commute at common times, network performance along congested travel routes, e.g., along main corridors of travel, continues to degrade making accessing content along congested travel routes less and less reliable. And during travel, the mobile network signal may be inconsistent or patchy. There may be regions where the signal, and hence the bandwidth, is strong and other regions where mobile network signal is low, and hence the bandwidth, which diminishes the streaming experience.

As users view content on mobile networks that suffer from bandwidth constraints, users will suffer from content interruption, quality degradation, and other service issues that impact the user's enjoyment of content. For example, a content recommendation system may inform a user that content that is of interest to the user is available, and the user may begin streaming the content while in a location with high network quality. As the user travels along the user's route, the user may experience a degradation of network performance, which impacts the ability for the user to consume content. Such network issues may come at inopportune moments, for example at the peak of action or during a scene of high interest to the user. For example, the user may have a strong preference for comedy and the content being consumed may be a mixed drama and comedy movie. The user may have no particular positive or negative reaction to missing a portion of the movie that is categorized as drama content but would have a negative reaction to missing a comedy scene. Therefore, the user may have a particularly adverse reaction if network issues caused degradation of playback of a content item during a comedy scene and the user would instead prefer content timed for playback so that suspected playback issues—based, for example on historical bandwidth availability along a known route—were aligned with drama scenes, e.g., less preferred scenes, as opposed to comedy scenes, e.g., more preferred scenes.

The systems and methods described herein address these issues by providing techniques to recommend content items based on known or estimated bandwidth constraints. For example, the systems described herein receive a request from a user device for a content recommendation. Such a request may include information describing a user's travel route and timing criteria, or otherwise provide information allowing a system to derive that information. The system may then develop a model of the estimated network bandwidth along that particular travel route for a particular time, or perhaps for a general time based on average utilization. Using the estimated network bandwidth, the system can tailor a content recommendation for the user to minimize the impact of network performance has on the user's playback of content. For example, the system may correlate the likelihood that a user is interested in various segments of a content items with the bandwidth available along a travel route to generate a recommendation score on whether to recommend a content item to a user or add a content item to a recommended playlist.

The system may employ several techniques for determining or estimating the bandwidth along a route. For example, the system may access historic logs for all users travel within segments of a route for a specific time or for all times and perform statistical analysis to estimate the bandwidth that could be available to the user's device when traveling along the same route. In some embodiments, the system may access logs specific to a user's device to determine bandwidth utilization of a device along a route traveled often. The network quality profile, e.g., signal profile or bandwidth profile, along a particular path may remain fairly constant as changes to the network quality likely require the addition or removal of network towers to significantly change the profile along a route. Therefore, the techniques described herein take advantage of historical usage along routes to estimate bandwidth availability. In some embodiments, the logs may further delineate specific services accessed by a specific user device or by all mobile network users, and that information may be used to refine the bandwidth estimates for access to content from specific services (e.g., a specific content streaming service such as Netflix).

When making content recommendations, the system may further identify segments of content that require, based on a known quality level, data rate, or other content related factors, more bandwidth than is estimated to be available along a given route. The systems and methods described herein may adjust those content segments, e.g., cropping content, cutting time out of a scene, reducing quality, or transcoding content, such that the content segments fit within the known or estimated bandwidth availability along a route for playback.

Traditional recommendation systems do not account for a user's travel when recommending content. Furthermore, traditional systems do not factor in network bandwidth when recommending content and the user's preference for segments as informed by the estimated bandwidth constraints during travel. The systems described herein offer several improvements over traditional systems. First, the system may refine content recommendations to optimize the likelihood that a user may enjoy recommended content without interruption of segments the user may be most interested in. Second, the system may more efficiently deliver content based on the estimated bandwidth availability or constraints by modifying content, e.g., transcoding segments, to fit within an estimated bandwidth profile. Finally, the system may automatically align content interests with known or estimated bandwidth profiles to ensure that the user is able to access segments of higher interest during travel at times where it is expected the user's device will have adequate bandwidth. Thus, the system disclosed herein can tailor recommendations to accurately reflect network conditions, especially along a planned route of travel, for users that are consuming content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
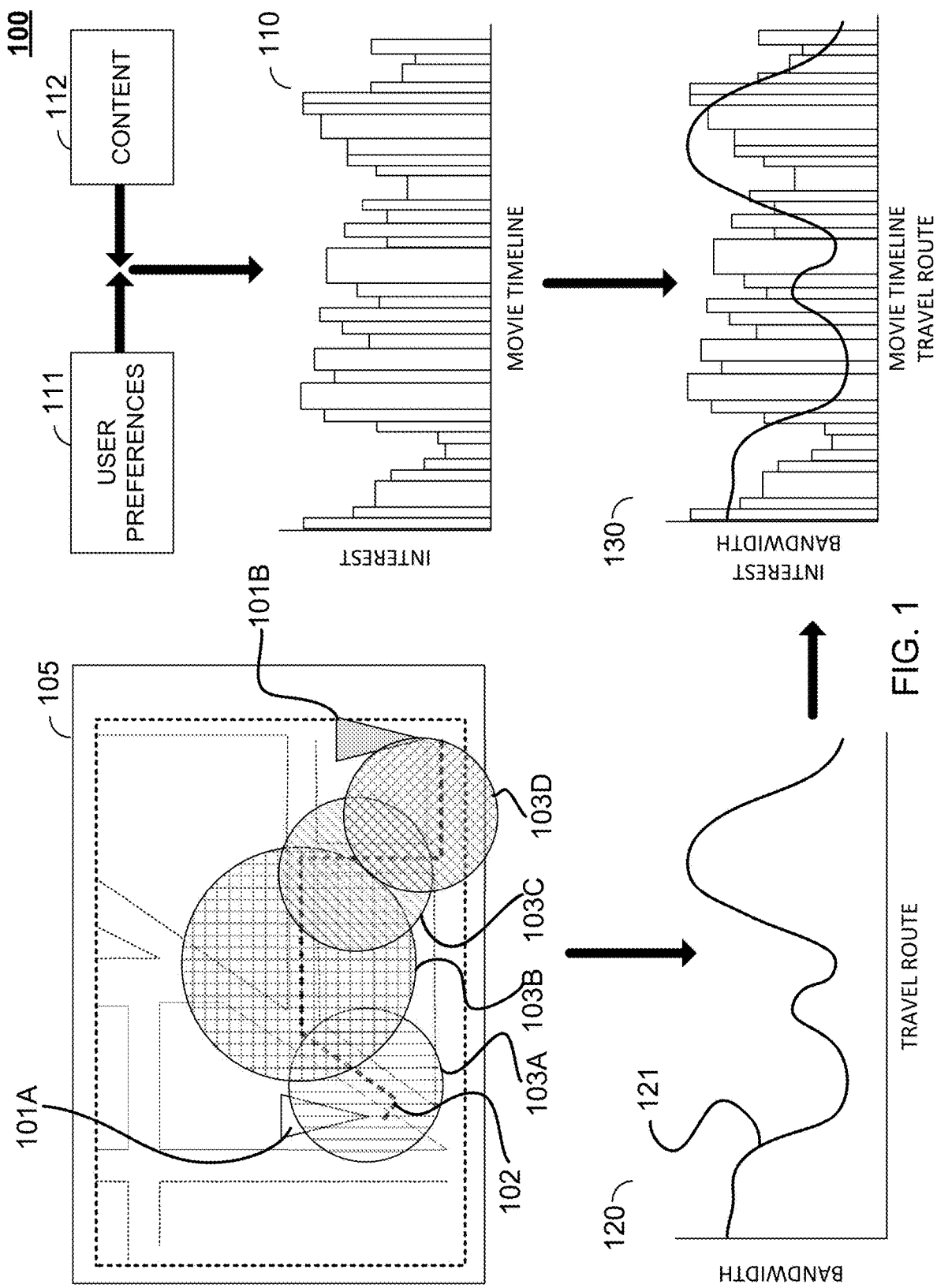
FIG. 1 shows an illustrative diagram correlating available bandwidth along a travel route to user interest in content, in accordance with some embodiments of the disclosure.

FIG. 1 shows an illustrative diagram correlating available bandwidth along a travel route to user interest in content, in accordance with some embodiments of the disclosure. FIG. 1 depicts a scenario 100 in which a system is using travel route information to correlate the interest that a user has in segments of content with the estimated bandwidth available along a travel route. FIG. 1 depicts a map 105 of a geographic travel route between two locations, a start point 101A and an end point 101B. For example, the start point 101A may coincide with a user's current location or a point entered by the user to designate a planned starting point for future travel. Thus, a content recommendation system may obtain the starting point 101A from a user (e.g., via communication with the user's mobile device) in any appropriate format, such as GPS coordinates, a street address (e.g., 2160 Gold Street, Santa Clara, Calif.), or as a placeholder that is connected to an underlying location (e.g., "Home" which is tied to the address of the user's home location). Similarly, the content recommendation system may obtain the end point 101B from a user (e.g., via communication with the user's mobile device).

The content recommendation system may then determine a route between the starting point 101A and ending point 101B. For example, the content recommendation system may employ a Dijkstra algorithm in a database of nodes that represent possible routes and weighted connections between the nodes that correlate with the costs (e.g., time costs, distance costs, or other weighting mechanism) between the travel nodes to determines a route between the two points. In some embodiments, the content recommendation system may transmit a request for a route to an external service (e.g., a third-party mapping service via an API). That request may identify the starting point 101A and the ending point 101B and receive a response that identifies several nodes in the travel route that represent a planned route.

Upon determining the route, the content recommendation system may identify a plurality of service areas associated with mobile network access. These service areas (e.g., service areas 103A-D) may correspond with individual mobile service transmitters (e.g., cellular towers) or may correspond with known levels of service. For example, service area 103A may be a service area with an average expected signal-to-noise ratio between the mobile device and transmitters between 0 and −30 dB. In some embodiments, the service areas 103A-D are defined based on expected average bandwidth available to the user for that service area (and, in some embodiments, for a given time period associated with the route). For example, the content recommendation system may obtain logs with information regarding the bandwidth availability of mobile networks or network speeds obtained by mobile devices along the route and then segment the route into sections based on tiers of mobile service based on the historical average bandwidth for each segment. Referring to the example of FIG. 1, the content recommendation system may determine that based on a predetermined start time, e.g., 5:30 PM, the bandwidth along a route starts in a first tier, represented by service area 103A, transitions to a second tier along the route in service area 103B, changes to a third tier of service in service area 103C, and the transitions to a fourth tier in service area 103D. The content recommendation system may partition the route based on estimated bandwidth at various levels of granularity based, in part, on the amount of data available to the content recommendation system to discern network conditions along a route.

The content recommendation system may also analyze logs of network activity to determine the level of granularity available for correlating bandwidth to segments of content and interest. For example, the content recommendation system may determine that it has sufficient data to segment a route into quarter-mile stretches and assign estimated bandwidth availability for predicted times along the route based on the logs available to the content recommendation system given the predicted start time for the route. But the content recommendation system may, given an alternative start time, have more bandwidth information available for the alternative time that allows the content recommendation system to segment the route into smaller divisions (e.g., eighth-mile stretches). The content recommendation system may use logs of network activity to assign an estimate of available bandwidth for a user's mobile device. For example, by analyzing the bandwidths attained by devices in the past, the content recommendation system may accurately estimate bandwidths that could be obtained by the user's mobile device along the route. In some embodiments, the network logs may contain information specific to the user's mobile device, which could increase the accuracy of the bandwidth estimation. Thus, the content recommendation system may obtain an identifier associated with the user's mobile device, e.g., an International Mobile Equipment Identity (IMEI) number, and correlate the data in the logs with the user's mobile device.

In some embodiments, the content recommendation system may also query a remote service or data source for information concerning the bandwidth expected along a route. For example, a service provider may host an API on a remote service that allows the content recommendation system to pass along a location identifier, e.g., GPS coordinate; a route, e.g., a series of coordinates; a start and end point; or any combination of location identifiers, and the remove server will reply with an estimated bandwidth or bandwidth profile. In some embodiments, such a service would take additional parameters, such as estimated times corresponding with each location or the route, characteristics of the mobile device traveling along the route, and/or information about the user, such as account information.

In some embodiments, the content recommendation system may refine the estimation of bandwidth using information associated with the user. For example, the content recommendation system may access account information, e.g., from a service provider's database or saved locally in the user's mobile device, associated with the user and determine the user's mobile device is enrolled in a plan that offers data at certain speeds. In some embodiments, the content recommendation system refines the bandwidth estimates using information about device capabilities of the user's mobile device and/or network infrastructure, e.g., transmission towers, along the route. For example, the content recommendation system may poll the device to obtain information about the device capabilities or may send test data, e.g., conduct a speed test, with the device to estimate bandwidth. In some embodiments, the content recommendation system may instruct the user's mobile device to transmit network traffic during travel along routes to specific remote servers, e.g., service provider-controlled servers, and the content recommendation system may log the network speeds attained in these transmissions in association with the user and service provider. Using these techniques, the content recommendation system may refine the bandwidth estimation along the travel route.

In FIG. 1, the content recommendation system has determined an exemplary bandwidth profile 121 for travel route 102 shown in graph 120. While map 105 depicts four service areas 103A-D, it is apparent from graph 120 that the content recommendation system, in this example, had access to sufficient data to construct a more granular bandwidth profile.

As noted above, the content recommendation system is designed, in some embodiments, to recommend content to the user based on a correlation of the bandwidth profile 121 with the content recommendation system's prediction of the user's interests in segments of a movie. For example, a user's mobile device may transmit a request for a recommendation to a remote server that is part of the content recommendation system that identifies the start point 101A, the end point 101B, a start time, and a user ID. Using that information, the content recommendation system accesses the user's preferences from a data store and correlate the user's preferences for types or categories of content with segments in candidate content items. Illustrated in the top right of FIG. 1, the content recommendation system accesses a data store to obtain the user preferences 111. Furthermore, the content recommendation system accesses a content database to obtain information about candidate content items, e.g., metadata describing segments of the content.

To correlate the user's interest in segments of content with the bandwidth available along a travel route, the content recommendation system splits the content into segments. In some embodiments, the content recommendation system splits the content into a series of segments based on information in the metadata of the content. For example, the metadata may define a plurality of scenes using time markers in the content and list categories or attributes corresponding with each scene such as "Scene 1; 0:00-14:23; comedy, drama, Jim Carrey." In some embodiments, the content recommendation system uses information regarding the estimated bandwidth profile, e.g., the segments defined in the bandwidth profile, to split the content into segments, and correlates the metadata with the content segments.

The content recommendation system determines an interest level of the user for each segment based on the user preferences 111 and metadata associated with each segment. For example, the content recommendation system may access a set of weights provided by the user for the strength of the user's interest in specific genres. The content recommendation system may also access metadata for each segment to determine a category score assigned to the segment for different categories. For example, if the metadata indicates that 86% of content in segment B of a content item is categorized as comedy, then the comedy score of that segment would be 86. It should be recognized that other scales may be employed in a similar fashion, e.g., the comedy score for segment B in this example may be 0.86 in other embodiments. The content recommendation system may employ various and/or multiple categories when reviewing segments. For example, the content recommendation system may identify actors in scenes and use screen time for each actor as a basis for category score; e.g., Jim Carrey may be in 53% of the screen time for a segment of a content item and the content recommendation system may give that segment a "Jim Carrey" score of 53. The content recommendation system may then weight category scores for each, e.g., multiply a category score, by a corresponding weight that the content recommendation system obtained from the user preferences 111. As note above, multiple category scores may apply to each segment, and the content recommendation system may combine the scores together, e.g., make a summation, to generate an interest-level score for each segment. In some embodiments, the content recommendation system may access a third-party system that provides interest levels for a given content item, e.g., content 112. In that scenario, the content recommendation application may transmit an identifier of the content 112, e.g., hash value or other unique identifier, along with information associated with the user, e.g., user preferences 111 or user ID, and receive back a set of interest levels for the segments of the content 112. The request for interest levels may further contain information identifying a plurality of segments, e.g., a plurality of start and stop times for each segment, and those segments are intended to be used by the remote server when it provides the interest levels for the segments. In some embodiments, the content recommendation system determines interest levels based on metadata associated with the segments that indicates the level of importance of the segment to the overall content item. For example, content creators may include segments of content that do not contain information pertinent to the content but, instead, contains elements included solely for artistic purposes. The metadata for such segments may indicate that the importance is low, while the metadata for a segment that conveys a critical plot point may indict the segment has a high importance. The content recommendation system may, therefore, assume that a user would have a high interest in the segments marked as important to the overall content.

In FIG. 1, interest profile 110 portrays a plurality of segments of content 112 along the x-axis of the interest profile. Along the y-axis, an interest level for each segment is portrayed. As discussed herein, the content recommendation system has determined or obtained the interest levels for segments of the content 112.

Upon determining a bandwidth profile 121 for a travel route and an interest profile 110 for a content item, e.g., content 112, the content recommendation system may correlate the two profiles. For example, a visual depiction of the correlation is shown as depiction 130 of FIG. 1 which depicts the correlation of bandwidth along a travel route to user interest in content over a movie timeline. When both the interest level of content is high and the bandwidth for a section of a travel route, during which the content recommendation system predicts the content 112 would be played to the user, is also high, there is a high correlation of the two profiles for that segment. In some embodiments, the content recommendation system may multiply the interest level for each segment of content by the bandwidth profile, e.g., a score representing the estimated bandwidth, for a corresponding travel segment and combine the individual results for each segment into an overall correlation score, e.g., a summation.

Figure 2:
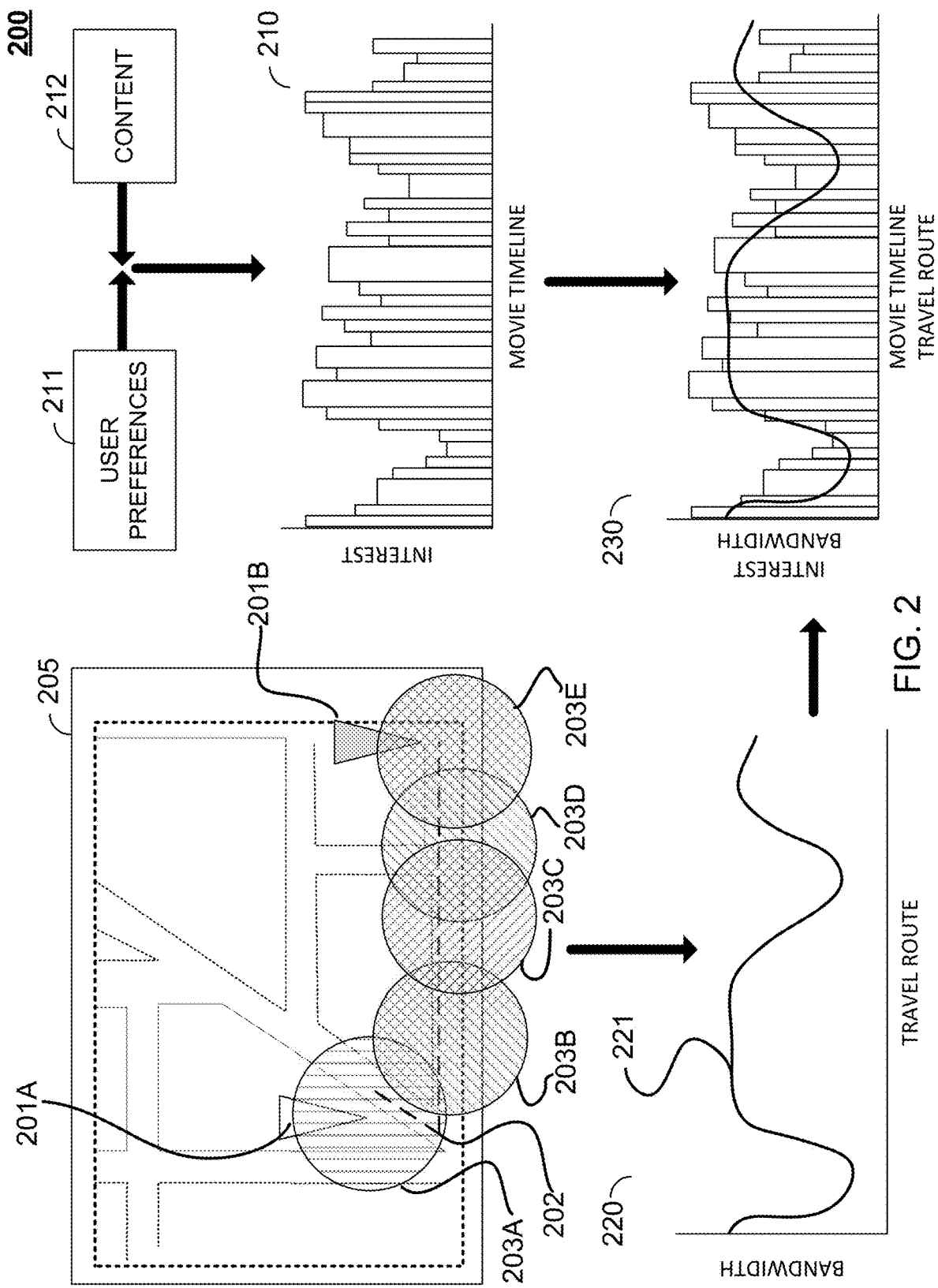
FIG. 2 shows another illustrative diagram correlating available bandwidth along a travel route to user interest in content, in accordance with some embodiments of the disclosure.

FIG. 2 shows another illustrative diagram correlating available bandwidth along a travel route to user interest in content, in accordance with some embodiments of the disclosure. Similar to FIG. 1, FIG. 2 shows scenario 200 with a map 205 depicting a travel route 202 between start point 201A and end point 201B. In this example, route 202 is an alternative to route 101 from FIG. 1. In FIG. 2, there are five service areas 203A-E. As described above, the segmentation of route 202 may be based on criteria such as changes in wireless network infrastructure, e.g., different cellular towers; changes in estimated signal strength, e.g., based on past measurement of network signal along the route; and/or changes in estimated network speed, e.g., based on past network activity logs along the route. In a manner similar to that described with FIG. 1, the content recommendation system determines as estimated bandwidth profile 221. And using the user preferences 211, which may be the same as user preferences 111 or different from user preferences 111, e.g., for a second user. The content recommendation system uses content 212 to generate, or obtain, an interest profile 210 for content 212. The content recommendation system correlates the bandwidth profile 221 with the interest profile 210. A visual depiction of the correlation is shown as depiction 230 of FIG. 2.

The content recommendation system may generate overall correlation scores for several candidate content items to determine the best recommendation candidate, e.g., the highest correlation score. In some embodiments, the content recommendation system may generate different correlation scores for a single content item, e.g., content 112. For example, the content recommendation system may assume that each of a plurality of candidate content items will start at the beginning of a travel route and then generate an overall correlation score for each of the plurality and select a recommended content item for the start of a travel route, e.g., route 102. The content recommendation system may then repeat the correlation for another plurality of candidate content items, e.g., the same content items as analyzed before, except the recommended starting content item, but starting instead at a travel point corresponding with the end of the starting content item. Using this process, the content recommendation system can determine a second candidate content item, also correlated to the bandwidth along the travel route, and add that item to a playlist for recommendation to the user.

Thus, the content recommendation system is configured to make recommendations based on the fact that the signal strength, and bandwidth, will vary from region to region along travel paths. The content recommendation system is also configured to make recommendations based on the fact that for given content, a particular user will be more interested in certain segments, or scenes, and less interested in other segments, or scenes. This content recommendation application may also be configured to make recommendations based on the fact that for given content, there are segments and scenes that are more important to the overall content and plot than other segments and scenes. The content recommendation system makes recommendations to minimize the impact of the patchiness of the cellular signal by recommending those movies to the user that, once started, play interesting segments during regions where the signal strength is high and play uninteresting or unimportant segments when the signal strength is low.

Figure 3:
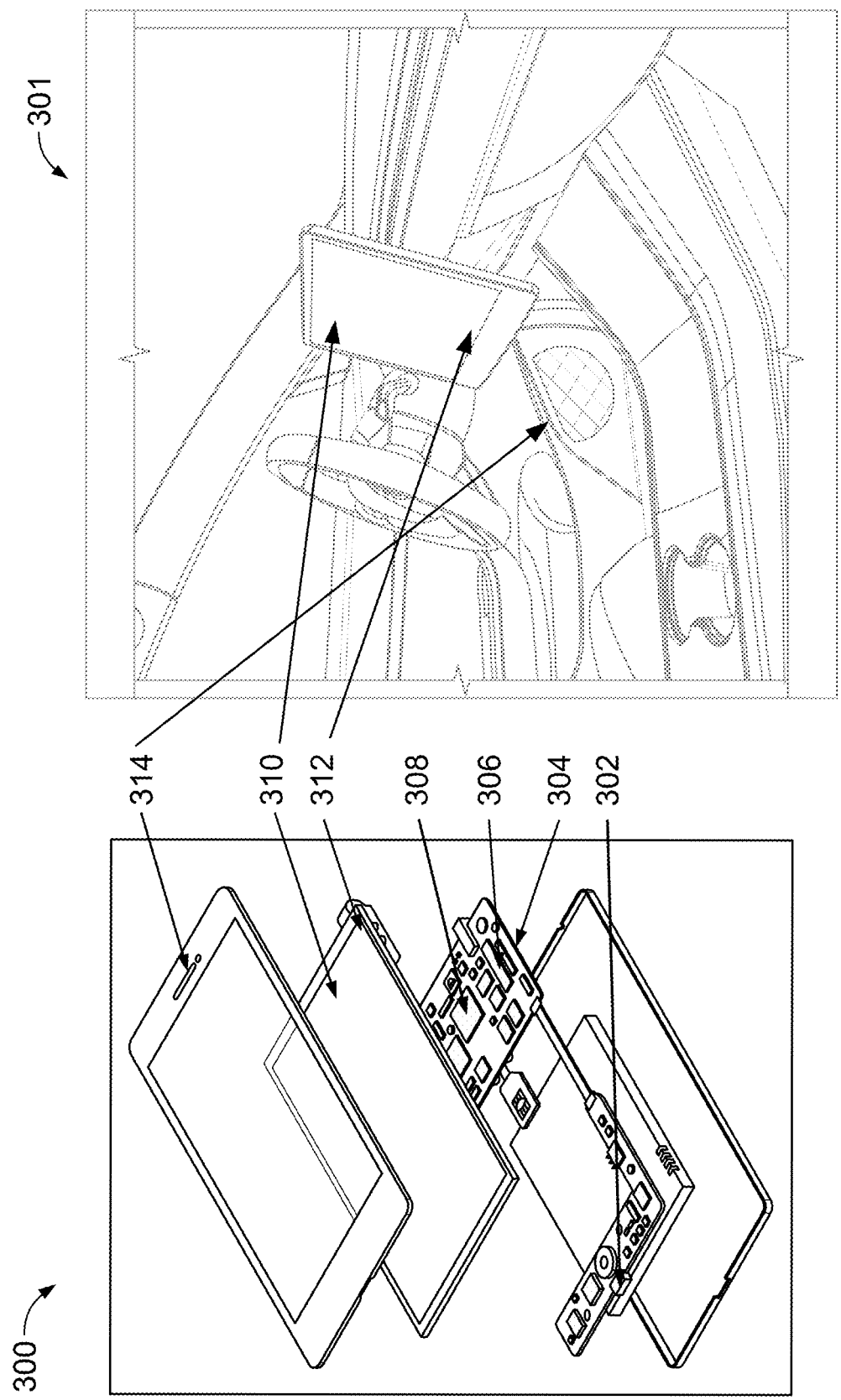
FIG. 3 is a diagram of illustrative content devices, in accordance with some embodiments of the disclosure.

FIG. 3 is a diagram of illustrative content devices, in accordance with some embodiments of the disclosure. Content device 300 is an exemplary mobile device, e.g., a phone or tablet. While content device 301 depicts a content delivery system that is integrated into an automotive system. In FIG. 3, several elements of content device 301 are integrated into the automobile structure and are not visible in the figure, but a person of skill in the art would understand that corresponding structure would be present in a content device as depicted in content device 301 whether shown in FIG. 3.

Content devices 300 and 301 may include may be communicatively connected to speaker 314 and display 312. In some embodiments, display 312 may be a television display or a computer display. In some embodiments, content device 301 may be communicatively connected to user interface input 310, e.g., a touchscreen or touch display. In some embodiments, user interface input 310 may be a remote control device. Content device 300 and 301 may include one or more circuit boards. In some embodiments, the circuit boards may include control circuitry and storage (e.g., RAM, ROM, Hard Disk, Removable Disk, etc.). In some embodiments, circuit boards may include an input/output path. Each one of user content device 300 and 301 may receive content and data via input/output (hereinafter "I/O") path, e.g., path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a recommendation application stored in memory (e.g., storage 308). Specifically, control circuitry 304 may be instructed by the recommendation application to perform the functions discussed above and below. For example, the recommendation application may provide instructions to control circuitry 304 to generate guidance displays, play content, and make content recommendations. In some implementations, any action performed by control circuitry 304 may be based on instructions received from the recommendation application.

In client server-based embodiments, control circuitry 304 may include communications circuitry suitable for communicating with a content delivery application server or other networks or servers. The instructions for carrying out the above-mentioned functionality may be stored on the content delivery application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer-readable medium, or any other suitable fixed or removable storage devices, and/or any combination of the same. Storage 308 may be used to store various types of content, media guidance data, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, play, or record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312.

Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The content delivery application and/or content access application may be implemented using any suitable architecture. For example, those applications may be stand-alone applications wholly implemented on each one of content device 300 and content device 301. In such an approach, instructions of the recommendation application are stored locally (e.g., in storage 308), and data for use by the recommendation application is downloaded on a periodic basis (e.g., from an out-of-band feed, from an Internet resource, or using another suitable approach). Control circuitry 304 may retrieve instructions for the recommendation application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the recommendation applications are client server-based application. Data for use by a thick or thin client implemented on each one of content device 300 and 301 is retrieved on-demand by issuing requests to a server remote to each one of content device 300 and 301. In one example of a client server-based content application, control circuitry 304 runs a web browser that interprets web pages provided by a remote server. For example, the remote server may store the instructions for the application in a storage device. The remote server may process the stored instructions using circuitry (e.g., control circuitry and generate the appropriate displays. The client device may receive the displays generated by the remote server and may display the content of the displays locally on content device 300 or 301. This way, the processing of the instructions is performed remotely by the server while the resulting displays are provided locally on content device 300 or 301. Content device 300 or 301 may receive inputs from the user via input interface 310 and transmit those inputs to the remote server for processing and generating the corresponding displays. For example, content device 300 or 301 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to content device 300 or 301 for presentation to the user.

In some embodiments, the recommendation applications are downloaded and interpreted or otherwise run by an interpreter or virtual machine (run by control circuitry. In some embodiments, the recommendation applications may be encoded in the ETV Binary Interchange Format (EBIF), received by control circuitry 304 as part of a suitable feed, and interpreted by a user agent running on control circuitry 304. For example, the recommendation applications may be an EBIF application. In some embodiments, the recommendation application may be defined by a series of JAVA-based files that are received and run by a local virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Figure 4:
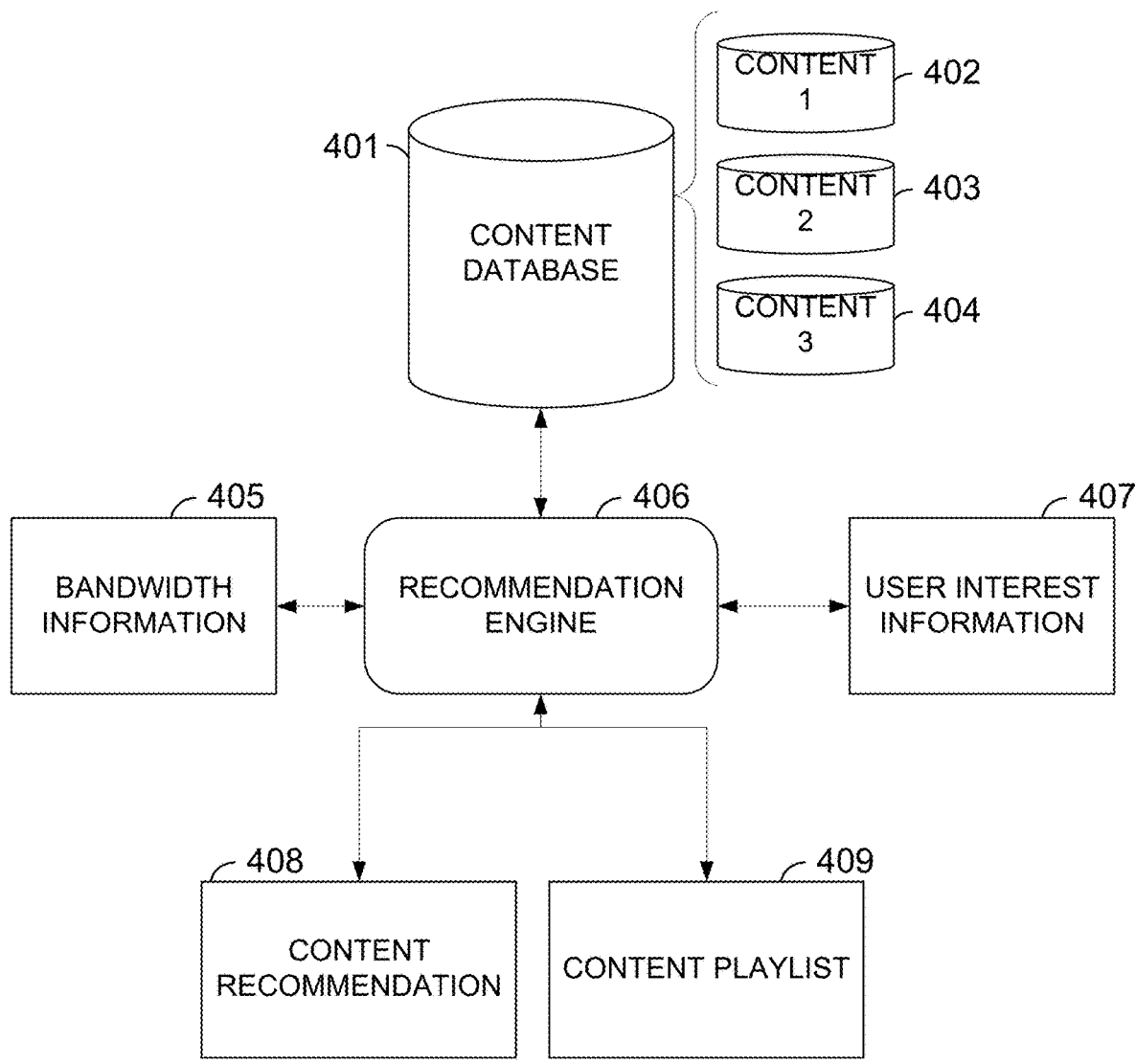
FIG. 4 is a diagram of an illustrative content recommendation system, in accordance with some embodiments of the disclosure.

FIG. 4 is a diagram of an illustrative content recommendation system 400, in accordance with some embodiments of the disclosure. The content recommendation system 400 comprises a content database 401 with storage for a plurality of content items 402, 403, and 404. Each content item may be an audio, video, or audiovisual item such as a podcast, a music stream, a musical album, a television show, a movie, a video stream, or other type of content item. In some embodiments, the content database 401 stores a digital copy of each content item (e.g., content items 402, 403, and 404). In some embodiments, the content database 401 stores information, e.g., metadata, about each content item, including an address for accessing the content item.

The content database 401 is in operative communication with a recommendation engine 406. The recommendation engine 406 is configured to run a recommendation application in accordance with the disclosure herein to make content and playlist recommendations to users based on the users' interest in segments of content and bandwidth information 405 corresponding with a travel route (e.g., routes 102 and 202). The bandwidth information 405 (e.g., bandwidth profiles) may be determined in the manners described herein from historical network activity along a route or may be retrieved from a remote service, e.g., a service provided by mobile network maintainers). The content recommendation system may determine users' interest in segments of content, e.g., interest profiles, using user interest information 407. For example, the user interest information may be stored in a database of user information or may be built based on a log of users' access to content including interaction that reflects interest in particular segments of content, such as repeating segments of content.

The recommendation engine 406 may then build content recommendations 408 and recommendations for content playlists 409 using the techniques described herein. Once the content recommendation system 400 provides a content recommendation 408 or content playlist 409 to content devices, the content recommendation system 400 may receive indications from the content devices that specify whether a content device accessed the content that was recommended or played content from the content playlist. The content recommendation system may take into account this information to adjust user preferences, e.g., user interest information 407, to improve recommendations.

Figure 5:
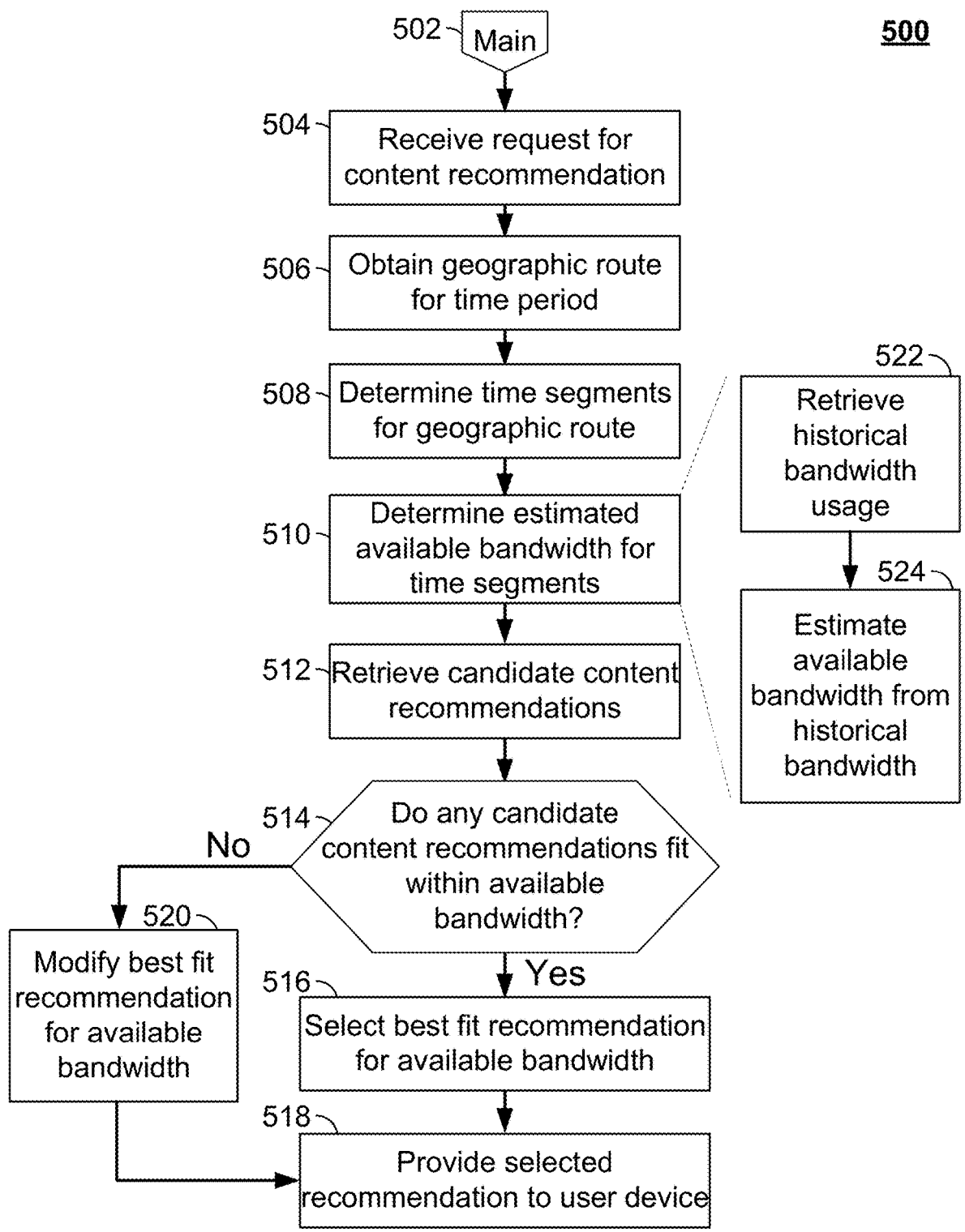
FIG. 5 is a flowchart of an illustrative detailed process for recommending content correlating with bandwidth constraints, in accordance with some embodiments of the disclosure.

FIG. 5 is a flowchart of an illustrative detailed process for recommending content correlating with bandwidth constraints, in accordance with some embodiments of the disclosure. It should be noted that each step of process 500 can be performed by control circuitry 304 (e.g., in a manner instructed to control circuitry 304 by the content recommendation application) or in a remote server as part of a content recommendation system, such as content recommendation system 400.

A main loop of a process for providing bandwidth constrained content recommendations begins at step 502. At step 504, a content recommendation application receives a request for a content recommendation (e.g., via user input from a content device 300). The request may comprise information identifying a start point, an end point, a time of travel, a plurality of nodes that comprise a travel route, and/or geographic keywords (e.g., home and school). The request may further comprise a time period for the content recommendation, e.g., a start time and duration.

At step 506, process 500 continues by obtaining a geographic route associated with the user device and the time period. In some embodiments, a content recommendation application retrieves a plurality of nodes from the recommendation request. In some embodiments, the content recommendation application generates a route between a start point and an end point. For example, control circuitry may access a plurality of nodes in a graph tree with weighted connections representing costs to travel between nodes. Each node represents a point within a graph of geographic routes, e.g., intersections of streets. The control circuitry 304 implements a Dijkstra algorithm on the graph of nodes to locate the least costly route between the start point and end point to obtain the geographic route. In some embodiments, process 500 may obtain the geographic route by communicating with a mapping service that provides that route.

Process 500 continues at step 508, where the content recommendation application (e.g., using control circuitry 304) determines, based on the geographic route and time period, a plurality of time segments. For example, the content recommendation application may determine that a user will be traveling for two hours from approximately 5:30 PM to 7:30 PM. The content recommendation application may further determine, based on the geographic route, the time period should be split into 4 segments, corresponding to the entry and exit times of four service areas (e.g., service areas 103A-D).

At step 510, process 500 continues where the content recommendation application (e.g., using control circuitry) determines an estimated available bandwidth for each of the plurality of time segments based on the geographic route and the user device. For example, the content recommendation application may access a bandwidth profile determined from a set of network activity and split the bandwidth profile into a plurality of segments. Thus, the content recommendation application may estimate the bandwidth available to a content device that is traveling along the geographic route at a given time, taking into account, for example, the time required to travel between service areas and the network speeds capable of being given to the content device in each service area. For example, the control circuitry 304 may retrieve information from storage 308 or from a remote server that identifies historical bandwidth usage or network access in service areas such as service areas 103A-D.

In some embodiments, the content recommendation application retrieves historical bandwidth usage at step 522 as part of determining the estimated bandwidth and continues at step 524 to determine the bandwidth profile from the historical bandwidth usage. For example, and as described with reference to FIG. 1, the content recommendation application obtains logs with information regarding the bandwidth availability of mobile networks or network speeds obtained by mobile devices along a route and then segments the route into sections based on tiers of mobile service based on the historical average bandwidth for each segment.

In some embodiments, the content recommendation application may analyze logs of network activity to determine the level of granularity available for correlating bandwidth to segments of content and interest. For example, the content recommendation application may determine that it has sufficient data to segment a route into quarter-mile stretches and assign estimated bandwidth availability for predicted times along the route based on the logs available to the content recommendation system given the predicted start time for the route. The content recommendation application may use logs of network activity to assign an estimate of available bandwidth for a user's mobile device. For example, by analyzing the bandwidths attained by devices in the past, the content recommendation application may accurately estimate bandwidths that could be obtained by the user's mobile device along the route. In some embodiments, the network logs may contain information specific to the user's mobile device, which could increase the accuracy of the bandwidth estimation. Thus, the content recommendation application may obtain an identifier associated with user's mobile device, e.g., an International Mobile Equipment Identity (IMEI) number, and correlate the data in the logs with the user's mobile device.

At step 512, process 500 retrieves a plurality of candidate content recommendations. For example, process 500 may access information identified in a user's profile as a watch-next list or a plurality of user preferences that the content recommendation application may correlate with available content items to retrieve a plurality of candidate items of interest.

Process 500 continues at step 514, where the content recommendation application determines whether any candidate content recommendation items fit within the available bandwidth. For example, the content recommendation application may determine the amount of bandwidth required to play back each candidate item with sufficient consistency, e.g., with a minimal amount of buffering or pausing to load content. The content recommendation application may accomplish this by splitting each candidate content item into a plurality of segments and analyzing the content to determine, for example, the bitrate required to stream the segments. The content recommendation application may then compare the bitrate for each segment with the bandwidth estimated by the content recommendation application along the user's travel route. In some embodiments, the content recommendation application may determine that the average bandwidth for each segment satisfies the bitrate requirements for that segment in the candidate content. In some embodiments, the content recommendation application may determine whether the average bandwidth for each segment is within a threshold of the bitrate for the segments of the candidate content.

If the content recommendation application is able to identify a candidate content item that does fit within the bandwidth profile, then process 500 continues at step 516. At step 516, process 500 selects a content recommendation from the plurality of candidate content recommendations based on correlating the estimated bandwidth for each of the plurality of time segments with interest levels associated with each of the plurality of time segments. The content recommendation application may, for example, correlate a user's interest in segments of content with the bandwidth available along a travel route, and the content recommendation system splits the content into segments. The content recommendation application splits a candidate content item into a series of segments based on information in the metadata of the content. For example, the metadata may define a plurality of scenes using time markers in the content and list categories or attributes corresponding with each scene such as "Scene 1; 0:00-14:23; comedy, drama, Jim Carrey." In some embodiments, the content recommendation system uses information regarding the estimated bandwidth profile, e.g., the segments defined in the bandwidth profile, to split the content into segments and correlates the metadata with the content segments.

The content recommendation application determines an interest level of the user for each segment based on the user preferences (e.g., user preferences 111) and metadata associated with each segment (e.g., metadata from storage 308). In some embodiments, the content recommendation application retrieves a set of weights provided by the user for the strength of the user's interest in specific genres. The content recommendation application may also access metadata for each segment to determine a category score assigned to the segment for different categories. As described with reference to FIG. 1, the content recommendation application may determine category scores, e.g., comedy score, or another interest correlation score. The content recommendation application may weight the category scores for each segment, e.g., multiply a category score by a corresponding weight that the content recommendation system obtained from the user preferences (e.g., user preferences 111). As noted above, multiple category scores may apply to each segment, and the content recommendation application may combine the scores together, e.g., make a summation, to generate an interest-level score for each segment.

The content recommendation application may correlate a bandwidth profile and an interest profile. For example, the content recommendation application may multiply the interest level for each segment of content with the bandwidth profile, e.g., a score representing the estimated bandwidth, for a corresponding travel segment and combine the individual results for each segment into an overall correlation score, e.g., a summation.

The content recommendation application determines a correlation score for each candidate content item and then selects the candidate content item with the highest corresponding correlation score. At step 518, the content recommendation application provides the selected recommendation to the content device. For example, the content recommendation application may transmit a message to the device that sent the initial request for a content recommendation.

If the content recommendation application is not able to identify a candidate content item that fits within the bandwidth profile, then process 500 continues at step 520. At step 520, process 500 modifies the recommendation that best fits the available bandwidth to fit within the bandwidth profile. For example, the content recommendation application may analyze the segments of the candidate content items to determine the compression and quality of the segments and convert the segments to a compression level and quality level that fits within the bandwidth profile for that segment. In some embodiments, the content recommendation application transcodes the segments from a higher quality level to a lower quality level. In some embodiments, the content recommendation application reduces the resolution, and therefore the number of pixels and data required.

It should be noted that this embodiment can be combined with any other embodiment in this description and that process 500 is not limited to the devices or control components used to illustrate process 500 in this embodiment.

Figure 6:
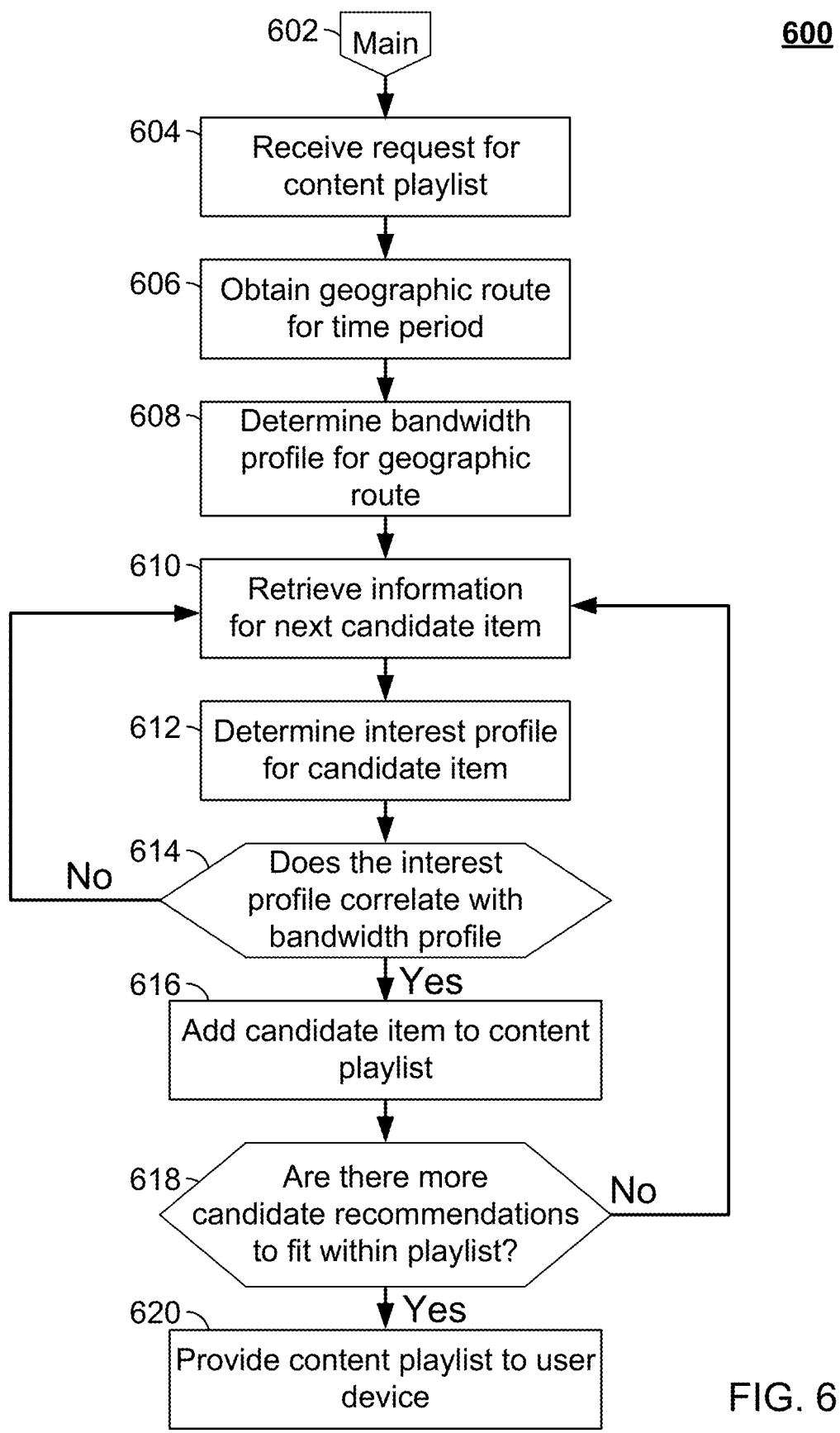
FIG. 6 is a flowchart of an illustrative detailed process for generating a playlist correlating with bandwidth constraints, in accordance with some embodiments of the disclosure.

FIG. 6 is a flowchart of an illustrative detailed process for generating a playlist correlating with bandwidth constraints, in accordance with some embodiments of the disclosure. It should be noted that each step of process 600 can be performed by control circuitry 304 (e.g., in a manner instructed to control circuitry 304 by the content recommendation application) or in a remote server as part of a content recommendation system, such as content recommendation system 400. Process 600 provides a mechanism to allow the content recommendation application to select a plurality of the content items from a plurality of candidate content items for inclusion in the content playlist based on the interest profile for the respective candidate content item and the determined bandwidth profile.

A main loop of a process for generating a bandwidth constrained content recommendation begins at step 602. At step 604, the content recommendation application receives (e.g., from a content device 300 or 301) a request for a content playlist. For example, the content recommendation application may receive a request from a content device that indicates a user would like a travel playlist with recommended content from a given time period and along a given route. As described above, the content recommendation application may obtain a geographic route associated with the user device and the time period at step 606 of process 600. At step 608, process 600 determines a bandwidth profile associated with the geographic route, the user device, and the time period as discussed above.

Similar to as described with reference to FIG. 5, the content recommendation application identifies a plurality of candidate content items based on a user profile associated with the user device. At step 610 of process 600, the content recommendation application retrieves the next candidate item. At step 612, the content recommendation application determines, using the techniques described in FIG. 1 and FIG. 5, an interest profile for the candidate item that represents the correlation of segments in the respective candidate content item and the user profile. At step 614, the content recommendation application generates an overall correlation score between a bandwidth profile for a travel route and the candidate content item. If the content recommendation application determines that the overall correlation score indicates that the interest profile correlates with the bandwidth profile, e.g., because the overall correlation score exceeds a predetermined threshold, then process 600 continues at step 616. If the overall correlation score indicates the bandwidth profile does not correlate with the interest profile, then process 600 continues at step 610 with retrieving the next candidate item.

At step 616 of process 600, the content recommendation application adds the candidate content item to a playlist. At step 618, the content recommendation application continues by determining whether there are more candidate recommendations to fit within the playlist. If so, process 600 continues at step 610. If not, process 600 continues by providing the content playlist to a user device (e.g., content device 300 or 301).

Figure 7:
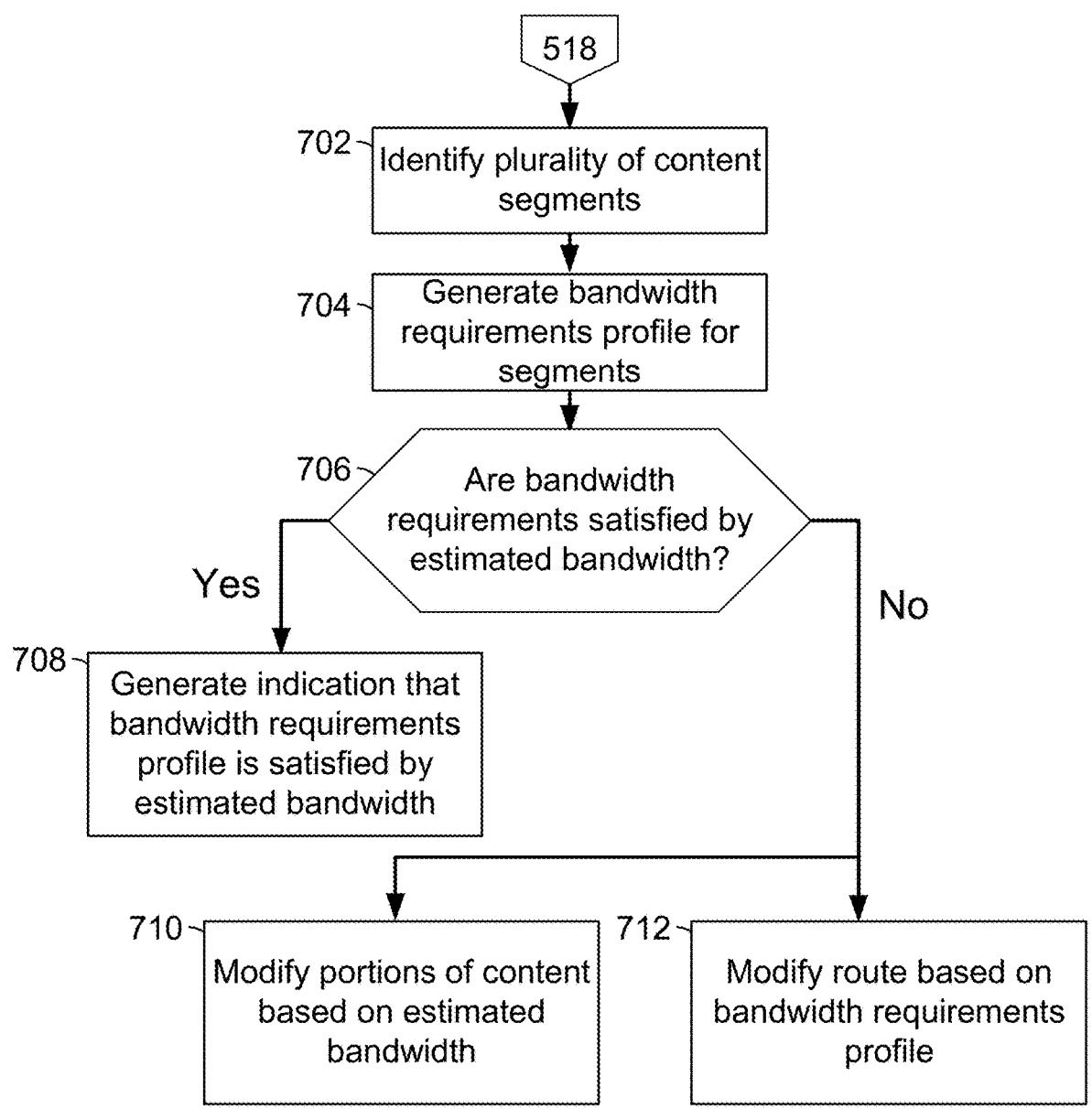
FIG. 7 is a flowchart of an illustrative detailed process for modifying content or travel routes to correlate with bandwidth constraints or requirements, in accordance with some embodiments of the disclosure.

FIG. 7 is a flowchart of an illustrative detailed process for modifying content or travel routes to correlate with bandwidth constraints or requirements, in accordance with some embodiments of the disclosure. It should be noted that each step of process 700 can be performed by control circuitry 304 (e.g., in a manner instructed to control circuitry 304 by the content recommendation application) or in a remote server as part of a content recommendation system, such as content recommendation system 400.

Process 700 begins after step 518 of process 500. At step 702, the content recommendation application (e.g., using control circuitry) identifies a plurality of segments in content identified by the content recommendation. For example, after the content device begins playing a content recommendation based on a content selection, the content recommendation application may continue monitoring whether the estimated bandwidth is sufficient to receive the content being recommended. At step 702, for example, the content recommendation application generates a bandwidth requirements profile for the plurality of segments based on the geographic route and the time period. The content recommendation application, at step 704 (e.g., via control circuitry) determines whether the bandwidth requirements profile is satisfied by the estimated bandwidth for each of the plurality of time segments. If the bandwidth requirements profile is satisfied by the estimated bandwidth for each of the plurality of time segments, then process 700 continues at step 708, where the content recommendation application generates for display an indication that the bandwidth requirements profile is satisfied by the estimated bandwidth for each of the plurality of time segments.

If the bandwidth requirements profile is not satisfied by the estimated bandwidth for each of the plurality of time segments, then process 700 can continue by modifying a portion of the content based on the estimated bandwidth or by modifying the travel route to obtain a route with more estimated bandwidth. Thus, process 700 may continue at either step 710 or step 712 or perform both steps in parallel. The segments of content may be modified to require less bandwidth as described above, e.g., by transcoding the segments. The content recommendation application may modify a travel route by searching for alterative travel routes and determining a bandwidth profile for the alternative route. If the alternative route corresponds with a bandwidth profile that satisfies the bandwidth requirements of the content item then the content recommendation application may select that alternative route and provide the alternative route to the content device.

Figure 8:
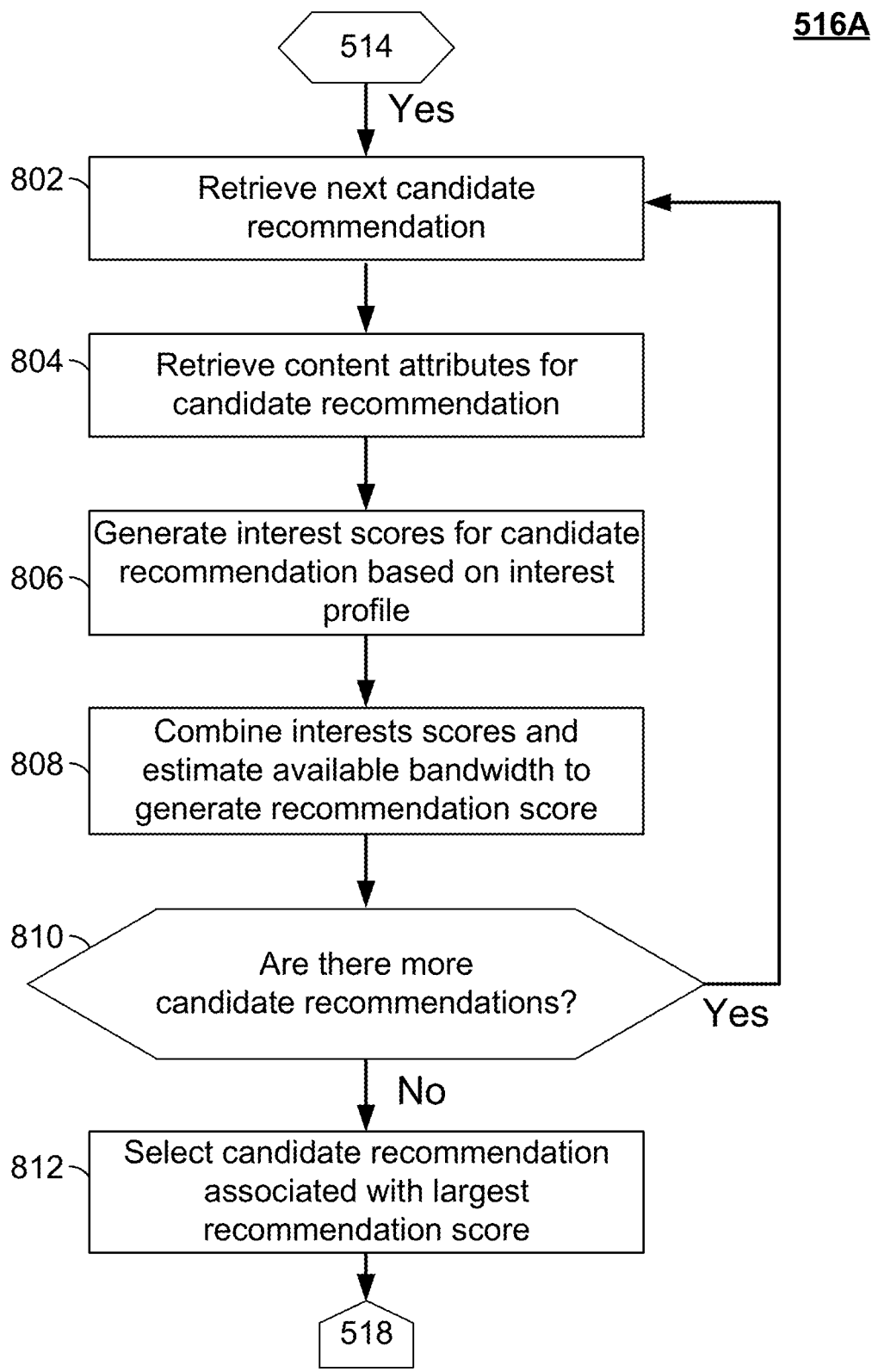
FIG. 8 is a flowchart of an illustrative detailed process for selecting a content recommendation among a plurality of candidate content recommendations, in accordance with some embodiments of the disclosure.

FIG. 8 is a flowchart of an illustrative detailed process 516A for selecting a content recommendation among a plurality of candidate content recommendations, in accordance with some embodiments of the disclosure. Process 516A expands on step 516 of FIG. 5. Following a positive determination at step 514, process 516A continues by generating a plurality of recommendation scores for the plurality of candidate content recommendations. At step 802, the content recommendation application retrieves the next candidate content item and continues process 516A at step 804 by retrieving a plurality of content attributes for that candidate content recommendation. The plurality of content attributes correspond with segments of content aligned with the plurality of time segments of the travel route. Process 516A continues at step 806 where the content recommendation application generates a plurality of interest scores for the respective candidate content recommendation based on the plurality of content attributes and an interest profile associated with the user device. For example, the content recommendation application may retrieve a user profile for a user logged into a content device (e.g., content device 300 and 301) and use the user's interest profile to generate interest scores for segments. The content recommendation application continues process 516A at step 808 by combining the plurality of interest scores and the estimated available bandwidth for each of the plurality of time segments to generate a recommendation score for the respective candidate content recommendation. At step 810, process 516A determines whether there are additional content recommendations to consider. If so, process 516A returns back to step 802. If not, process 516A continues at step 812 and selects a content recommendation that is associated with the largest recommendation score from the plurality of recommendation scores.

Figure 9:
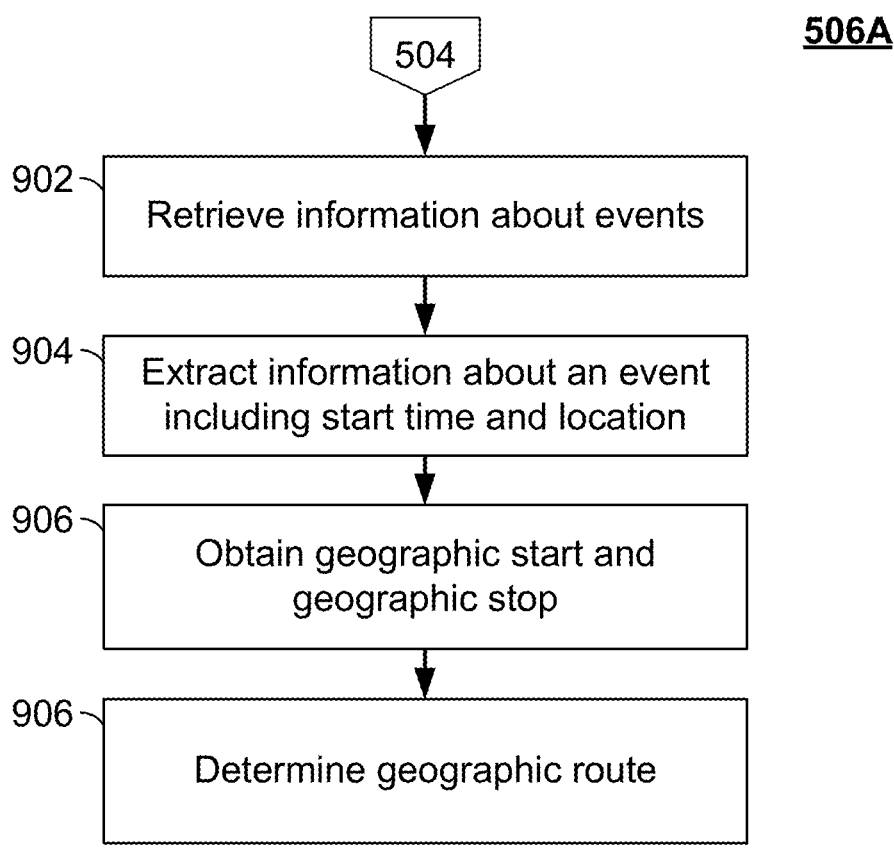
FIG. 9 is a flowchart of an illustrative detailed process for obtaining a travel route, in accordance with some embodiments of the disclosure.

FIG. 9 is a flowchart of an illustrative detailed process for obtaining a travel route, in accordance with some embodiments of the disclosure. Process 506A expands on step 506 of FIG. 5. Process 506A begins after step 504 of FIG. 5 where the content recommendation application retrieves information about a plurality of events associated with the user device. For example, the content recommendation application may access a calendar data source or calendar service to obtain information about events on a user's calendar. At step 904, process 506A continues where the content recommendation application extracts information about an event from the plurality of events. For example, the content recommendation application may identify that the next event on the user's calendar has a start time in the next two hours and is associated with a location over 60 miles away. The content recommendation application may then, at step 906, obtain a geographic start location and a geographic stop location based on information about the event and geographic information associated with the user device. For example, the content recommendation application may use a content device's current location as the start point and the event's location as the end point. As described above, the content recommendation application may then determine, at step 906, the geographic route using the geographic start location and geographic stop location.

Figure 10A:
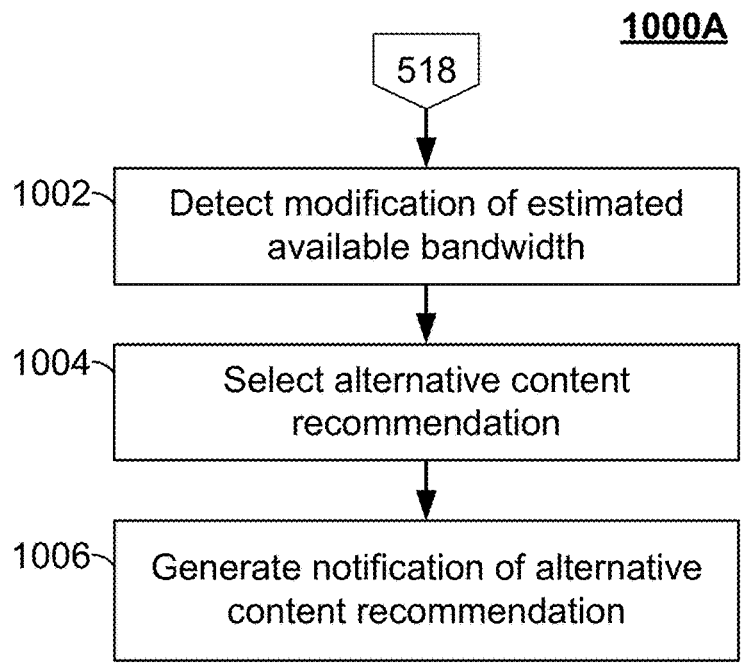
FIG. 10A is a flowchart of an illustrative detailed process for generating an alternative content recommendation in response to changes in bandwidth constraints, in accordance with some embodiments of the disclosure.

FIG. 10A is a flowchart of an illustrative detailed process for generating an alternative content recommendation in response to changes in bandwidth constraints, in accordance with some embodiments of the disclosure. It should be noted that each step of process 1000A can be performed by control circuitry 304 (e.g., in a manner instructed to control circuitry 304 by the content recommendation application) or in a remote server as part of a content recommendation system, such as content recommendation system 400.

Process 1000A begins after step 518 of process 500. At step 1002, the content recommendation application detects a modification of the estimated available bandwidth for each of the plurality of time segments. For example, the content recommendation application may continue to monitor network conditions including logs of network access, congestions levels, network activity of peer devices, signal-to-noise ratio, and/or the network speeds obtained during continued network access. The content recommendation application, through this monitoring, may determine that network speeds and estimated bandwidth have diminished, and that alternative content is needed. At step 1004, the content recommendation application continues process 1000A by selecting an alternative content recommendation from the plurality of candidate content recommendations based on correlating the modified estimated bandwidth for the time with interest levels associated with each of the plurality of time segments. Once an alternative recommendation is located, the content recommendation application generates a notification of the modification of the estimated available bandwidth for the time segment and of the alternative content recommendation.

Figure 10B:
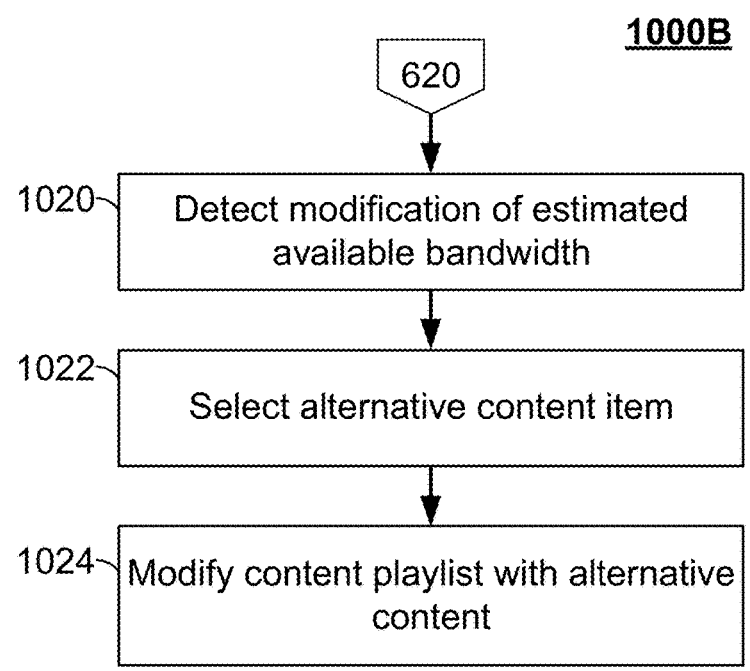
FIG. 10B is a flowchart of an illustrative detailed process for modifying a playlist in response to changes in bandwidth constraints, in accordance with some embodiments of the disclosure.

FIG. 10B is a flowchart of an illustrative detailed process for modifying a playlist in response to changes in bandwidth constraints. It should be noted that each step of process 1000B can be performed by control circuitry 304 (e.g., in a manner instructed to control circuitry 304 by the content recommendation application) or in a remote server as part of a content recommendation system, such as content recommendation system 400.

Process 1000B begins after step 620 of process 600. At step 1020, the content recommendation application detects a modification of the estimated available bandwidth for each of the plurality of time segments. For example, the content recommendation application may continue to monitor network conditions including logs of network access, congestion levels, network activity of peer devices, signal-to-noise ratio, and/or the network speeds obtained during continued network access. The content recommendation application, through this monitoring, may determine that network speeds and estimated bandwidth have diminished, and that alternative content is needed. At step 1022, the content recommendation application continues process 1000B by selecting an alternative content item from the plurality of candidate content recommendations based on correlating the modified estimated bandwidth for the time with interest levels associated with each of the plurality of time segments. Once an alternative recommendation is located, the content recommendation application modifies the content playlist with the new recommendation. For example, the content recommendation application may remove a content item and put the alternative recommendation in its place.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in realtime. It should also be noted, the systems and/or methods described above may be applied to, or used in accordance with, other systems and/or methods.

What is claimed is:

1. A method for generating a content playlist, the method comprising:
   receiving, from a content device, a request for a content playlist, wherein the request comprises a time period associated with playback of content;

obtaining a geographic route based on a geographic start location and a geographic stop location of the content device and the time period;

determining a bandwidth profile associated with the geographic route, the content device, and the time period;

identifying a plurality of candidate content items based on a user profile associated with the content device;

determining, for each of the plurality of candidate content items, an interest profile representing the correlation of segments in the respective candidate content item and the user profile;

selecting a plurality of the selected content items from the plurality of candidate content items for inclusion in the content playlist based on the interest profile for the respective candidate content item and the determined bandwidth profile comprises:

generating a plurality of recommendation scores for the plurality of candidate content items by:

retrieving a plurality of content attributes for each respective candidate content item, wherein the plurality of content attributes corresponds with segments of content aligned with the plurality of time segments;

generating a plurality of interest scores for the respective candidate content item based on the plurality of content attributes and an interest profile associated with the content device; and combining the plurality of interest scores and the estimated available bandwidth for each of the plurality of time segments to generate a recommendation score for the respective candidate content item;

sorting the plurality of candidate content items using the generated recommendation score for each respective candidate item; and identifying a subset of the sorted plurality of candidate content items to include in the content playlist, wherein a total runtime of the subset of the sorted plurality of candidate content items does not exceed a travel time associated with the geographic route; and providing the content playlist to the content device.

2. A system for generating a content playlist, the system comprising:

communication circuitry configured to receive, from a content device, a request for a content playlist, wherein the request comprises a time period associated with playback of content;

control circuitry configured to:

obtain a geographic route based on a geographic start location and a geographic stop location of the content device and the time period;

determine a bandwidth profile associated with the geographic route, the content device, and the time period;

identify a plurality of candidate content items based on a user profile associated with the content device;

determine, for each of the plurality of candidate content items, an interest profile representing the correlation of segments in the respective candidate content item and the user profile;

select a plurality of the selected content items from the plurality of candidate content items for inclusion in the content playlist based on the interest profile for the respective candidate content item and the determined bandwidth profile by generating a plurality of recommendation scores for the plurality of candidate content items by:

retrieving a plurality of content attributes for each respective candidate content item, wherein the plurality of content attributes corresponds with segments of content aligned with the plurality of time segments;

generating a plurality of interest scores for the respective candidate content item based on the plurality of content attributes and an interest profile associated with the content device; and combining the plurality of interest scores and the estimated available bandwidth for each of the plurality of time segments to generate a recommendation score for the respective candidate content item;

sorting the plurality of candidate content items using the generated recommendation score for each respective candidate item; and identifying a subset of the sorted plurality of candidate content items to include in the content playlist, wherein a total runtime of the subset of the sorted plurality of candidate content items does not exceed a travel time associated with the geographic route; and provide the content playlist to the content device.

3. A non-transitory computer-readable medium having instructions encoded thereon that when executed by control circuitry cause the control circuitry to:

receive, from a content device, a request for a content playlist, wherein the request comprises a time period associated with playback of content;

obtain a geographic route based on a geographic start location and a geographic stop location of the content device and the time period;

determine a bandwidth profile associated with the geographic route, the content device, and the time period;

identify a plurality of candidate content items based on a user profile associated with the content device;

determine, for each of the plurality of candidate content items, an interest profile representing the correlation of segments in the respective candidate content item and the user profile;

select a plurality of the selected content items from the plurality of candidate content items for inclusion in the content playlist based on the interest profile for the respective candidate content item and the determined bandwidth profile by:

generating a plurality of recommendation scores for the plurality of candidate content items by:

retrieving a plurality of content attributes for each respective candidate content item, wherein the plurality of content attributes corresponds with segments of content aligned with the plurality of time segments;

generating a plurality of interest scores for the respective candidate content item based on the plurality of content attributes and an interest profile associated with the content device; and combining the plurality of interest scores and the estimated available bandwidth for each of the plurality of time segments to generate a recommendation score for the respective candidate content item;

sorting the plurality of candidate content items using the generated recommendation score for each respective candidate item; and identifying a subset of the sorted plurality of candidate content items to include in the content playlist, wherein a total runtime of the subset of the sorted plurality of candidate content items does not exceed a travel time associated with the geographic route; and provide the content playlist to the content device.

4. The method of claim 1, further comprising:

detecting a change in the bandwidth profile associated with the geographic route, the content device, and the time period;

determining that bandwidth requirements for a content item in the content playlist will not be satisfied based on the changes in the bandwidth profile;

selecting, from the plurality of candidate content items, an alternative content item; and replacing the content item with the alternative content item in the content playlist.

5. The method of claim 1, wherein determining the bandwidth profile associated with the geographic route, the content device, and the time period comprises:

retrieving historical bandwidth usage for segments of the geographic route; and estimating available bandwidth for segments of the geographic route at estimated entry and exit times associated with each segment of the geographic route based on the historical bandwidth usage for the respective segment of the geographic route.

6. The method of claim 1, wherein determining the bandwidth profile associated with the geographic route, the content device, and the time period comprises:

retrieving logs of past network access speeds for the content device along the geographic route; and estimating, based on the logs of past network access speeds for the content device, available bandwidth for segments of the geographic route.

7. The method of claim 1, wherein obtaining the geographic route associated with the content device and the time period comprises:

retrieving information about a plurality of events associated with the content device;

extracting information about an event from the plurality of events, wherein the event is scheduled for the time period;

obtaining a geographic start location and a geographic stop location based on information about the event and geographic information associated with the content device; and determining the geographic route using the geographic start location and geographic stop location.

8. The system of claim 2, wherein the control circuitry is further configured to:

detect a change in the bandwidth profile associated with the geographic route, the content device, and the time period;

determine that bandwidth requirements for a content item in the content playlist will not be satisfied based on the changes in the bandwidth profile;

select, from the plurality of candidate content items, an alternative content item; and replace the content item with the alternative content item in the content playlist.

9. The system of claim 2, wherein the control circuitry determines the bandwidth profile associated with the geographic route, the content device, and the time period by:

retrieving historical bandwidth usage for segments of the geographic route; and estimating available bandwidth for segments of the geographic route at estimated entry and exit times associated with each segment of the geographic route based on the historical bandwidth usage for the respective segment of the geographic route.

10. The system of claim 2, wherein the control circuitry determines the bandwidth profile associated with the geographic route, the content device, and the time period by:

retrieving logs of past network access speeds for the content device along the geographic route; and estimating, based on the logs of past network access speeds for the content device, available bandwidth for segments of the geographic route.

11. The system of claim 2, wherein the control circuitry obtains a geographic route associated with the content device and the time period by:

retrieving information about a plurality of events associated with the content device;

extracting information about an event from the plurality of events, wherein the event is scheduled for the time period;

obtaining a geographic start location and a geographic stop location based on information about the event and geographic information associated with the content device; and determining the geographic route using the geographic start location and geographic stop location.

12. The non-transitory computer-readable medium of claim 3, further comprising instructions that cause the control circuitry to:

detect a change in the bandwidth profile associated with the geographic route, the content device, and the time period;

determine that bandwidth requirements for a content item in the content playlist will not be satisfied based on the changes in the bandwidth profile;

select, from the plurality of candidate content items, an alternative content item; and replace the content item with the alternative content item in the content playlist.

13. The non-transitory computer-readable medium of claim 3, wherein the instructions cause the control circuitry to determine the bandwidth profile associated with the geographic route, the content device, and the time period by:

retrieving historical bandwidth usage for segments of the geographic route; and estimating available bandwidth for segments of the geographic route at estimated entry and exit times associated with each segment of the geographic route based on the historical bandwidth usage for the respective segment of the geographic route.

14. The non-transitory computer-readable medium of claim 3, wherein the instructions cause the control circuitry to determine the bandwidth profile associated with the geographic route, the content device, and the time period by:

retrieving logs of past network access speeds for the content device along the geographic route; and estimating, based on the logs of past network access speeds for the content device, available bandwidth for segments of the geographic route.

15. The non-transitory computer-readable medium of claim 3, wherein the instructions cause the control circuitry to obtain the geographic route associated with the content device and the time period by:

retrieving information about a plurality of events associated with the content device;

extracting information about an event from the plurality of events, wherein the event is scheduled for the time period;

obtaining a geographic start location and a geographic stop location based on information about the event and geographic information associated with the content device; and determining the geographic route using the geographic start location and geographic stop location.

\* \* \* \* \*